3,193,220
GYRO ERECTION SYSTEM FOR AN AIRPLANE
Leonard M. Greene, Chappaqua, N.Y., assignor to Safe Flight Instrument Corporation, White Plains, N.Y., a corporation of New York
Filed June 18, 1962, Ser. No. 203,318
15 Claims. (Cl. 244—79)

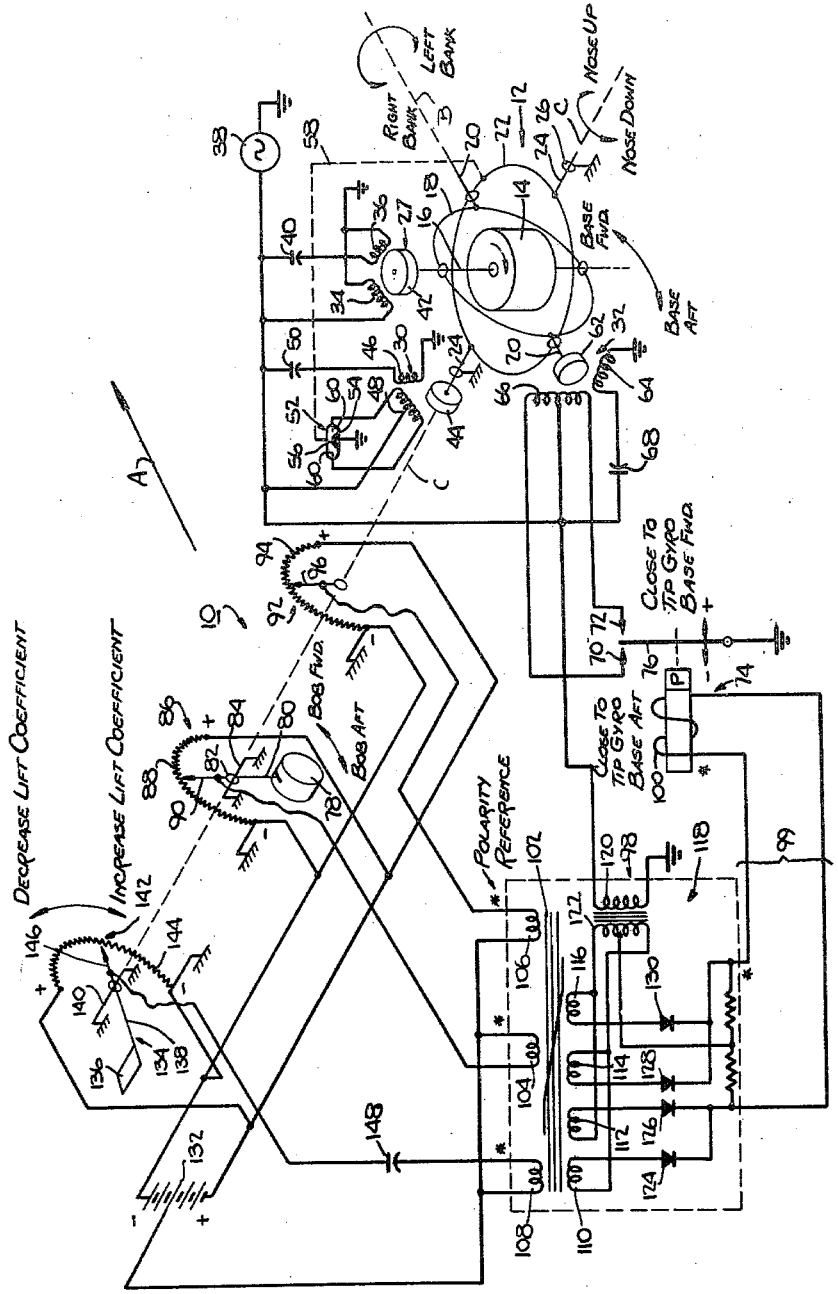

This invention relates to a gyro erection system for an airplane. More specifically, my invention pertains to an improved and novel erection system for the fore and aft vertical plane of an airplane mounted vertical gyro.

For various purposes, as for example to provide a reference vertical axis or a reference horizontal plane, a vertical gyro is carried aboard an airplane. An arrangement so employing a vertical gyro is illustrated and described in my copending application for United States Letters Patent Serial No. 853,516 filed November 17, 1959, for Airplane Instruments, now Patent No. 3,043,540 issued July 10, 1961. In this arrangement a sensing means is provided which is responsive to the forward acceleration of an airplane in a fashion that is essentially independent of the pitch attitude of the airplane. To determine the pitch attitude for such purpose, a vertical gyro aboard the airplane furnishes a reference horizontal plane or a reference vertical axis. The present invention is concerned with the fore and aft erection system for such a gyro.

A vertical gyro is so erected that its spin axis points toward the center of the earth. This is accomplished either directly by some pendulous means or by reference to some pendulous means. The inertia of the spinning gyro rotor resists a change in its spin axis direction so that the pendulous means only slowly changes the orientation of this axis. This slow change in orientation is called the erection of the gyro. When a vertical gyro is carried aboard an airplane the erection system through the medium of the pendulous means, in addition to being acted upon by the acceleration force of gravity, is acted upon by the forward acceleration force, if any, to which the airplane is being subjected. Because of this whenever an airplane is forwardly accelerated for an appreciable period of time, long enough to noticeably affect the orientation of the gyro spin axis, the pendulous controlled erection system will during that period of time be influenced by the forward acceleration in a direction away from a true vertical and thereby cause the gyro to become miserected away from the true vertical. I wish to mention at this point that the term "forward acceleration" encompasses both positive and negative acceleration in a forward direction. A negative forward acceleration is sometimes hereinafter referred to as forward deceleration.

When a vertical gyro is forwardly accelerated upon an increase in airplane speed the fore and aft pendulous means will be deflected aft from the vertical causing a corresponding miserection rate for the spin axis of the gyro which pitches the gyro rotor base aft to eventually match the orientation of the pendulous means. Similarly when the airplane is forwardly decelerated, the spin axis of the gyro will be miserected so as to tip the gyro rotor base forward.

In an arrangement which measures and combines lift and forward acceleration such as that shown in my aforesaid application and United States Letters Patent a forward acceleration which is essentially independent of the pitch attitude of the airplane is obtained by comparing the position of a pendulum pivoted about a lateral axis with the position of a gyro vertical i.e., a gyroscopical controlled horizontal reference platform or plane. If such an arrangement has a gyro reference platform miserected by a prolonged period of forward airplane speed change (such as the period when the airplane slows down prior to landing) the resulting base forward miserection of the reference gyro will cause an error in the output indication of the arrangement. This error will be unconservative in that the forward acceleration will be measured between a pendulum and a gyro which latter after a period of forward deceleration is tipped base forward, this being a direction of error which in said arrangement indicates a more positive forward acceleration than does actually exist. As a result, the arrangement of my aforesaid application will, if the fore and aft pendulous controlled erection system is left uncaged during acceleration, have an apparent input of a non-existent positive forward acceleration which causes the pilot to overly slow down and undershoot his desired approach speed. This situation will slowly correct itself as the gyro erection system corrects the miserection as the airplane's forward deceleration is checked.

The occurrence of such an error during periods of forward acceleration or deceleration can be avoided by temporarily disconnecting or deactivating the gyro erection system. However, it would be far more convenient, particularly in connection with deceleration preparatory to landing, automatically to correct (compensate for) such deceleration induced error in the vertical gyro and its erection system.

It is an object of my invention to provide an airplane mounted gyro erection system in which forward acceleration and deceleration induced errors are simply and conveniently corrected.

It is another object of my invention to provide a gyro erection system of the character described in which the aforesaid correction is accomplished through the use of aerodynamic sensing means rather than through acceleration sensing means so that factors such as airplane pitch attitude which might affect an accelerometer can be disregarded and so that availablbe aerodynamic sensing means which already are present for other purposes can serve an additional function and thus reduce the most of the erection correction means.

It is another object of my invention to provide a gyro erection system of the character described which utilizes an aerodynamic sensing means for correcting the erection of a vertical gyro so that the system will be responsive to an aerodynamic parameter which is an inherently better measure of prevailing flight conditions than is an abstract force measuring means.

Other objects of my invention in part will be obvious and in part will be pointed out hereinafter.

My invention accordingly consists in the features of construction, combinations of elements and arrangement of parts which will be exemplified in the device hereinafter described and of which the scope of application will be indicated in the appended claims.

In the accompanying drawings in which is shown one of the various possible embodiments of my invention the single schematic and circuit diagram illustrates a fore and aft lift rate corrected gyro erection system for an airplane.

In general I provide a system and method for correcting for the effect of forward acceleration on the fore and aft erection system of an airplane mounted vertical gyro, said system and method being particularly useful in connection with deceleration effects which in an arrangement such as shown in my copending application will cause the pilot to fly the airplane at a somewhat less than desired forward speed for landing. It is important to correct this situation because the control of the airplane may be hazardous during this period when the airplane is overly slowed down. The manner in which I accomplish this correction is essentially as follows:

During the period of airplane deceleration the wing lift coefficient or angle of attack (a measure of wing lift coefficient) required to support an airplane is changeable. Either the wing lift coefficient or the angle of attack furnish a lift value for an airplane, such for instance as the lift ratio, this being a fraction of which the numerator is the prevailing lift and the denominator is the maximum lift available, that is to say, the total lift that would be available if the attitude of the airplane was changed to a point just approaching stall. All of these terms e.g. lift coefficient, angle of attack and lift ratio will be generically and jointly referred to herein as the "lift" of the airplane. The change in lift occurs because the lift (angle of attack or lift coefficient or lift ratio) must be increased to compensate for the reduced forward speed or aerodynamic pressure so that the rate of change of lift is a function of the forward acceleration. According to my present invention I make use of a change in lift signal to derive a correction signal for preventing gyroscopic mis-erection in a fore and aft vertical plane.

Thus, the present invention contemplates the provision of a system for erecting an airplane mounted vertical gyro which system basically includes a fore and aft erecting means for the vertical spin axis of a gyro, said erecting means being controlled by a pendulous means turning about a lateral axis and subject, therefore, to error induced by forward acceleration of the airplane. The system further includes an error correcting component comprising means responsive to the rate of change of lift of the airplane and means connecting said rate of change of lift responsive means to the fore and aft gyro erecting means so as to furnish an additional control (over and above the pendulous means) for the fore and aft gyro erecting means, such additional control being exerted in a direction and to an extent which for decreasing lift is opposite and approximately equal to that in which the vertical gyro is affected via the pendulous means by forward acceleration of the airplane.

More particularly the fore and aft erecting means includes for cooperation with the pendulous means a pitch pickoff on the vertical gyro and a comparator, e.g. an adder, constructed and arranged to sense any difference (deviation) between the position of the pendulous means and the fore and aft (pitch) position of the gyro spin axis. The said erecting means also includes a torquer operative on the roll axis of the gyro (and therefore effective to control the position of the pitch axis of the gyro, i.e. the pitch position of the gyro spin axis), said torquer being regulated by the difference between said two positions whereby the fore and aft position of the gyro spin axis will follow, i.e. be slaved to, the position of the pendulous means. Of course, as is well known, the following movement of the gyro spin axis is very slow, that is to say it lags in time considerably behind the quick movement of the pendulous means.

The foregoing erecting means, as thus broadly described, is not by itself the subject of my present invention; however it does constitute an element thereof. I utilize with this means another means responsive to the rate of change of lift of the airplane. I add the outputs of said two means and employ the combined outputs to control the pitch torquer for the vertical gyro (the torquer actually being situated to act on the roll axis), the output of the rate of change of lift means being added in a sense, i.e. direction, to oppose the control of the pitch torquer affected by the action of the forward acceleration on the pendulous means. Moreover the control of the pitch torquer by the output of the rate of change of lift means is made approximately equal for all values of rate of change of lift to the control of the pitch torquer by the pendulous means through the forward acceleration that engenders the rate of change of lift whereby the fore and aft pitch position of the gyro spin axis is dephased from the fore and aft position of the pendulous means by approximately the angular amount equal to the shift in position of the pendulous means caused by the prevailing forward acceleration.

In the illustrated and preferred form of my invention about to be described in detail I add the outputs of the various means used to control the pitch axis of the vertical gyro (i.e. the pitch torquer on the roll axis), to wit the output from the pendulous pitch erection means, the output from the pitch pickoff and the output from the means responsive to the rate of change of lift of the airplane so that only a single combined output regulates the pitch torquer.

Referring now in detail to the drawings, the reference numeral 10 denotes a gyro erection system for an airplane in which system there is included an erection correction component embodying my present invention. The line of flight of the airplane in which the system and the gyro are carried is indicated by the reference character A. This is the line of flight of the airplane with respect to its local air mass.

The system 10 is designed for use with a vertical gyro 12 of conventional construction and which is adaped to be used for furnishing a reference horizontal platform or a reference vertical axis in an arrangement such as is illustrated and described in my aforesaid copending application for Letters Patent. The gyro 12 includes a spinning weight 14 secured to a vertical weight shaft 16. The ends of the weight shaft are journalled in bearings in a vertical gimbal ring 18 that lies in a vertical plane parallel to the longitudinal axis of the airplane, i.e. a fore and aft plane, the same being parallel to the line of flight A. The gimbal ring 18 is provided with trunnions 20 journalled to turn on a roll axis B (parallel to the line of flight) in bearings carried by a second horizontal gimbal ring 22, the trunnions and bearings being located in a fore and aft line in the plane of the gimbal ring 18. The second gimbal ring 22 is journalled by horizontal trunnions 24 that constitute the pitch axis C on a structural element of the airplane, e.g. in bearings 26 fixed to the airplane frame. The pitch axis C is at right angles to the line of flight A and to the roll axis B. The spinning weight 14 is rotated at high speed by a spin motor 27 of any conventional construction.

As is well known, in an arrangement of this character the gimbal ring 22 and the trunnions 24 constituting the pitch axis C will remain fixed (with the gimbal ring horizontal) when the airplane experiences pitching movement, i.e. changes its pitch angle; that is to say if the airplane rotates in space so as to raise or lower its nose the gimbal ring 22 will not experience a corresponding angular movement but will remain fixed in a plane parallel to the ground if no other force acts upon the gyro.

The gyro 12 has associated therewith erecting mechanisms, the presence of such mechanisms per se being conventional. For roll erection the gyro 12 has a roll erection torquer 30 which is connected to the pitch axis. For pitch erection the gyro has a pitch erection torquer 32 which is connected to the roll axis. In particular the roll erection torquer is connected to one of the pitch trunnions 24 and the pitch erection torquer is connected to one of the roll trunnions 20.

The spin motor 27 constitutes for example a pair of stator coils 34, 36 fed from a source 38 of alternating current. One of the coils is directly connected to the source and the other is connected through a capacitor 40 so that the coils are out of phase. Moreover the coils are arranged in quadrature so that they will generate a rotating magnetic field in which there is located a magnetic disc 42 fixed to the weight shaft 16.

The roll erection torquer is entirely conventional and consists of a disc 44 of material that will be turned by the action of a rotating magnetic field. Said disc is fixed to the pitch axis C of the gyro, e.g. to a pitch trunnion 24. As is well known, a torque exerted on this axis will, over a period of time, slowly vary the angular position of the roll axis, i.e. cause the gimbal ring 18 to turn, albeit very slowly, about the roll axis B. To generate the rotating magnetic roll erection field the roll erection torquer 30 includes two stator coils 46, 48 arranged in quadrature. Both coils are fed from the source 38 of alternating current, the coil 46 being fed through a capacitor 50 so that the stator coils 46, 48 are out of phase and will create a rotating magnetic field. The stator coil 48 is fed at its center point and the ends of the coil are connected through a roll axis bubble switch 52 to ground which constitutes the return connection to the source 38 of alternating current. Which of the two halves of the stator coil 48 is effective will depend upon the position of the bubble switch 52. When one half of the coil 48 is effective the rotating magnetic roll erection field will turn in one direction and when the other half is effective the rotating magnetic roll erection field will turn in the opposite direction.

The roll erection bubble switch constitutes a pendulous means that consists of an elongated capsule 54 which is curved along its length to provide a curved track for a mercury bead 56 located internally thereof. The capsule is so physically located in the airplane that its length extends in a lateral direction, the radius of curvature of the capsule being centered on the roll axis of the airplane or an axis parallel thereto so that if the gimbal ring 22 rolls in either direction the mercury bead will experience movement relative to the capsule in the opposite direction. The capsule is fixed to the horizontal gimbal ring 22 or to an element movable therewith. The connection between the capsule and such ring 22 is schematically indicated by the dotted line 58. Terminals 60 are provided at the opposite ends of the capsule to be contacted by the mercury bead when the capsule rolls in one direction or the other. Thereby when the spin axis of the gyro wanders form a true vertical about the roll axis the roll trunnion 20 will turn and rotate the capsule 54 while the bead remains stationary. This will cause a connection to be made between one of the terminals 60 to a middle ground contact through the bead so as to actuate one half or the other of the stator coil 48 and thereby supply a corrective roll erection torque to the pitch trunnion 24. This torque in turn will cause rotation of the trunnions 20 in the gimbal ring 22. When the gyro spin axis reaches true vertical with respect to the roll axis the mercury bead will disengage the end terminal and the roll erection torquer becomes ineffective.

It will be apparent that the connection between the capsule 54 and the roll trunnion 20 constitutes a roll pickoff for the gyro which pickoff cooperates with the roll pendulous means consisting of the mercury bead and its curved track so that the combination of the roll pendulous means, the roll pickoff and the roll erection torquer slaves the roll position of the vertical spin axis to the position of the true vertical in a lateral plane.

The pitch erection torquer is similar to the roll erection torquer in that it too constitutes a disc 62 of a material which will be turned by the action of a rotating magnetic field, e.g. a magnetic material. The disc 62 is fixed to a roll trunnion 20. The rotating magnetic field for the disc 62 is provided by a pair of stator coils 64, 66 arranged in quadrature and fed from the source 38 of alternating current, the coil 64 being fed through a capacitor 68 so that the magnetic fields of the two coils will be out of phase. As in the case of the coil 48 the coil 66 is fed at a center point from the source of alternating current so that the rotating magnetic field of the pitch erection torquer will turn in one direction or the other depending upon which half of the coil 66 is energized.

The two terminals of the coil 66 are respectively connected to stationary contacts 70, 72 of a polar relay 74 having a movable contact 76 connected to ground as a return connection to the source of alternating current. When the polar relay is idle the movable contact 76 is between and out of engagement with both stationary contacts 70, 72. When the polar relay is energized the movable contact will engage one or the other of the stationary contacts 70, 72 depending upon the polarity of energization of the relay. Thus depending upon the polarity energization of said relay one half or the other of the stator coil 66 will be actuated and the pitch erection torquer will be operative to apply torque to the roll trunnion 20 in one direction or the other. Such torque applied to the roll trunnion 20 will, by gyroscopic action, tilt the vertical spin axis of the gyro weight about the pitch axis.

The pitch pendulous means for controlling the pitch erection torquer 32 constitutes a pendulum bob 78 secured to an arm 80 that is journalled at 82 to a shaft 84 which is fast on the airplane framework. Said shaft and journal are so disposed that the pendulum bob turns about a lateral axis, that is to say, an axis perpendicular to the line of flight A and which axis is horizontal when the airplane is in horizontal position. The position of the pendulum bob is sensed by a pitch pendulum potentiometer 86 consisting of a resistance winding 88 fast to the framework of the airplane. A potentiometer tap 90 rides on the winding 88, the tap being functionally integral with the pendulum arm 80. Thereby the position of the pendulum arm will generate a signal which is a function of the position of the pendulum bob and which, if the potentiometer 86 is supplied with direct current, will furnish a polar signal to indicate whether the bob has moved fore or aft of a central vertical position.

The pitch pickoff which senses the position of the pitch axis of the gyroscope for comparison with the position of the pitch pendulum constitutes a pitch pickoff potentiometer 92 comprising a resistance winding 94 and a tap 96. The winding 94 is fast to the frame of the airplane and the tap 96 is fast to an element of the gyro, e.g. the gimbal ring 24 which turns about the pitch axis of the gyro or to the disc 44 of the roll erection torquer, these being functionally integral, whereby the voltage signal generated by the pitch pickoff potentiometer will be a function of the pitch position of the spin axis of the gyro weight.

I provide means to compare these two signals, as by addition, and to feed the same to the polar relay 74 for control of the pitch erection torquer. Such means includes a reset magnetic adding amplifier 98. Such an amplifier is conventional per se, a typical amplifier of this nature is manufactured by Airpax Electronics Inc., Seminole Division, of Fort Lauderdale, Fla., the same being known as series 5800. This type of amplifier includes a plurality of control inputs, a power input and a polar output 99. The value and polarity of the output are functions of the values and polarities of the inputs. Thus if there are only two inputs, to wit those derived from the potentiometers 86, 92, and if such inputs are equal and opposite the output from the adding amplifier will be zero. If either input predominates the output will have the polarity of the predominating input and a value which is a function of the difference in values of the two inputs. The output 99 of the magnetic adding amplifier is connected to the actuating coil 100 of the polar relay so as to control the direction of the rotating magnetic field of the pitch erection torquer.

A simplified internal diagram for the reset magnetic adding amplifier has been illustrated merely by way of example. Said amplifier includes a nonlinear control core 102 having three primary input control coils 104, 106, 108. The input coil 104 has applied to it the output from the pitch pendulum potentiometer 86 and the input coil 106 has applied to it the output from the pitch pickoff potentiometer 92. The input coil 108 is provided for another output which will be described hereinafter. There are four secondary output ocntrol coils 110, 112, 114, 116 on the core 102 which coils are energized from a power transformer 118 having a primary winding 120 and a secondary winding 122, said coils being energized from the secondary winding. The primary winding 120 is energized from the source 38 of alternating current. The secondary control output coils are grouped in pairs arranged to be powered by the opposite halves of the secondary winding 122 of the power transformer in order that a polar output may be obtained. Each of the secondary control output coils has series connected in its output a different rectifier 124, 126, 128, 130 as is customary in a reset magnetic amplifier. The outputs from all of the secondary control coils are merged and passed through a resistance network to the ouptut 99 of the reset magnetic adding amplifier 98.

The pitch pendulum potentiometer 86 and the pitch pickoff potentiometer 92 have voltage supplied thereto from a D.C. source, e.g., a battery 132. The opposite terminals of the battery are connected to the opposite ends of the resistance windings 88, 94 respectively. The central terminal of the battery is connected to one terminal of each of the primary input control coils 104, 106. The other terminal of each of the primary input control coils 104, 106 is connected to the sliding taps 90, 96, respectively, of the potentiometers 86, 92. Since the two potentiometers are similarly connected to the terminals of the battery 132 the primary input control coils 104, 106 are arranged to be energized in opposition. This is accomplished in the illustrated magnetic amplifier by having the center tap of the battery 132 connected to opposite ends of the input coils 104, 106. That is to say the center tap of the battery is connected to the right hand end of the input coil 104 and the left hand end of the input coil 106 and said coils are wound in the same sense. Any other arrangement can be used which causes the outputs of the two potentiometers 86, 92 to have opposite effects on the polar relay 74 so that if the signals generated by these two potentiometers are of equal value but opposite polarity the output of the amplifier will be zero and the polar relay will not be actuated.

So long as the third primary control coil 108 has a zero input applied thereto, the position of the movable contact 76 of the polar relay will depend upon the relationship between the fore and aft position of the vertical spin axis of the gyro as sensed by the pitch pickoff and the fore and aft position of the pitch pendulum bob 78. Suppose for example that the bob 78 is truly vertical but that the fore and aft position of the vertical spin axis of the gyro is not truly vertical. In such event the input to the coil 104 is zero but the input to the coil 106 differs from zero so that there will be an output from the amplifier 98 which output is a function of the voltage derived from the tap 96. This output will be applied to the actuating coil 100 of the polar relay to engage the movable contact 76 with an appropriate stationary contact 70, 72 thereby to energize an appropriate half of the stator coil 66. In turn this will create a rotating magnetic field which spins in the proper direction to slowly turn the vertical spin axis of the gyro in a fore and aft direction until it matches the vertical position of the pitch pendulum bob.

However if the airplane is experiencing positive forward acceleration the pitch pendulum bob will be deflected aft and will apply an input to the pitch pendulum coil 104 which if not matched and opposed by the input to the pitch pickoff coil 106 will cause the pitch erection torquer to turn the spin axis of the gyro about the pitch axis until it matches the angular position of the bob. It is this latter false pitch erection condition which the present invention corrects through the use of the third primary input control coil 108 to which there is applied an electric signal which is a function of the rate of change of lift of the airplane.

To the foregoing end the system 10 includes a means 134 sensitive to lift of the airplane. Any suitable type of lift sensing means can be employed for this purpose as, for instance, a means that will measure the position of the shifting stagnation point on the nose of an airplane wing or a means for measuring the angle of attack. Said lift sensing means has associated therewith a transducer for translating the response of the sensing means into an appropriate variable electrical value, e.g. a voltage that can be fed to the input coil 108. As shown herein the means 134 constitutes an angle of attack vane 136 fixed to a shaft 138 that turns about a lateral shaft 140 i.e. a shaft perpendicular to the line of flight A and horizontal when the airplane is horizontal.

The vane 136 controls a lift potentiometer 142 including a resistance winding 144 fixed to the framework of the airplane and a tap 146 which rides on the winding. The tap is fast to the vane shaft 138. The opposite ends of the resistance winding 144 are connected to the battery 132. One terminal of the third primary input control coil 108 is connected to the central tap of the battery and the other terminal of the third coil is connected to the tap 146.

There is interposed in this last connection a capacitor 148. It will be appreciated that the value of the voltage appearing at the potentiometer tap 146 is a function of lift but this voltage is blocked from the third coil 108 by the capacitor 148. However pursuant to my invention I do not wish to apply a lift signal as a correction to the amplifier 98 but, rather, a rate of change of lift signal and it is for this reason that the capacitor 148 is provided. Due to the presence of the capacitor, the current flowing to the amplifier 98 is proportional to the rate of change of the lift signal. Thus the capacitor's charge or discharge current is used as the third input to the magnetic adding amplifier the other inputs to which previously described are the current from the pitch pendulum potentiometer 86 and the current from the pitch pickoff potentiometer 92.

Voltage is applied to the resistance winding of the lift potentiometer 142 in such a sense and the third primary input control coil 108 is so wound and connected through the capacitor 148 to the lift potentiometer that a decrease in lift will create an effect in the amplifier 98 opposite to the effect in the amplifier of an increase in forward acceleration, i.e. an effect opposite to that created by movement of the pendulum bob in an aft direction. This aft movement of the bob will apply positive potential to the left hand end of the coil 104, a decrease in lift will apply a positive potential to the right hand end of the coil 108. Since both coils are wound in the same sense the effect of forward acceleration on the pitch bob will be offset, i.e. compensated for or corrected, by the effect of a rate of change of lift as the lift decreases. The resistances of the potentiometers are so selected that the corrective voltage derived from the potentiometer 142 and the capacitor 148 in addition to being in the opposite sense is of the proper magnitude to approximately offset the change in voltage output from the adder 98 arising from a change in pitch pendulum position caused by forward acceleration. Therefore when the airplane experiences forward acceleration with the aerodynamically concomitant change in lift, the effect of these two factors on the pitch position of the spin axis of the gyro will be offset and said axis will maintain a correct pitch position corresponding to the true vertical. Phrased differently, the polar relay by responding to the sum of all three inputs will cause the gyro spin axis to be erected to a pitch position which is equal to the position of the pitch pendulum means less the corrective lift rate signal derived from the lift potentiometer 142 and capacitor 148 which lift rate signal is substantially equal to that portion of the pitch pendulum signal due to forward acceleration.*

By way of example and to assist in the understanding of my invention let it be assumed that an airplane is slowing down at the rate of two knots per second and let it

---

\* The polarity reference asterisks in the drawing on the indicated ends of the input coils 108, 104, and 106 and at the indicated end of the polar relay coil 100 are a convenient aid to denote the relative electrical effect of the lift potentiometer 142, the pitch pendulum potentiometer 86, and the pitch pickoff potentiometer 92 with respect to said polar relay coil. When a signal of any given sign appears at the asterisk-marked end of any one input coil a signal of the same sign will appear at the asterisk-marked end of the relay coil. When signals of mixed signs appear at the asterisk-marked ends of two or more input coils the sign of the signal of the asterisk-marked end of the polar relay coil will depend on the relative magnitudes and signs of the signals at the asterisk-marked ends of the input coils.

further be assumed that this deceleration would deflect the pitch pendulum bob 78 approximately 3° forward. If this pendulum bob were used as a reference for the fore and aft (pitch) erection of the gyro spin axis the gyro would start to miserect and if the condition persisted it would in a few minutes become miserected by 3° base forward when the change in the pitch pickoff signal would be equal to the change in the pitch bob signal. However by the operation of the system 10 the rate of change of lift signal which is necessary to support the airplane's weight as the forward speed decreases two knots per second will generate a corrective current in the coil 108 opposite to the current caused to flow in the coil 104 by deflection of the pitch bob 78 3° forward and thereby when summed with the pitch bob current in the magnetic amplifier 98 it will cancel, i.e. void, the miserecting of the gyroscope spin axis in a fore and aft (pitch) direction.

It thus will be seen that I have provided a device which achieves the several objects of my invention, and which is well adapted to meet the conditions of practical use.

As various possible embodiments might be made of the above invention, and as various changes might be made in the embodiment set forth, it is to be understood that all matter herein described or shown in the accompanying drawings is to be interpreted as illustrative and not in a limiting sense.

Having thus described my invention, I claim as new and desire to secure by Letters Patent:

1. In a gyro erection system for an airplane mounted vertical gyro and which system includes a gyro pitch erecting means controlled by a pendulous means turning about a lateral axis and subject to error caused by forward acceleration: an error correcting arrangement comprising means responsive to the rate of change of lift of the airplane and means connecting said last named means to the gyro pitch erecting means to additionally control the gyro pitch erecting means in a direction opposite to that in which the gyro pitch erecting means is affected by forward acceleration of the airplane.

2. In a gyro erection system for an airplane mounted vertical gyro and which system includes a gyro pitch erecting means controlled by a pendulous means turning about a lateral axis and subject to error caused by forward acceleration: an error correcting arrangement comprising means responsive to the rate of change of lift of the airplane and means connecting said last named means to gyro pitch erecting means to additionally control the gyro pitch erecting means in a direction and to an extent which for decreasing lift is opposite and approximately equal to that in which the gyro pitch erecting means is affected by positive forward acceleration of the airplane.

3. In a gyro erection system for an airplane mounted vertical gyro and which system includes a gyro pitch erecting means controlled by a pendulous means turning about a lateral axis and subject to error caused by forward acceleration: an error correcting arrangement comprising means responsive to the rate of change of lift of the airplane and means connecting said last named means to the gyro pitch erecting means to additionally control the gyro pitch erecting means in a direction and to an extent which for decreasing lift is opposite and approximately equal to that in which the gyro pitch erecting means is affected through the pendulous means by positive forward acceleration of the airplane.

4. In a gyro erection system for an airplane mounted gyro having a vertical spin axis and which system includes an electrical gyro pitch erecting means controlled by an electrical signal derived from a pendulous means turning about a lateral axis and subject to error caused by forward acceleration of the airplane: an error correcting arrangement comprising means responsive to the rate of change of lift of the airplane and having a variable electrical output and circuit means connecting said variable output to said gyro pitch erecting means to additionally control the gyro pitch erecting means in a direction and to an extent which for decreasing lift is opposite and approximately equal to that in which the gyro pitch erecting means is affected through the pendulous means by positive forward acceleration of the airplane.

5. A combination as set forth in claim 4 which further includes means having a variable electrical output responsive to the pitch position of the gyro spin axis and wherein the circuit means includes means to add the position of the pendulous means, the pitch position of the gyro spin axis and the rate of change of lift so that the pitch position of the gyro spin axis will match the pitch position of the pendulous means in the absence of forward acceleration of the airplane and so that in the presence of forward acceleration the rate of change of lift will angularly shift the pitch position of the gyro spin axis from the pitch position of the pendulous means by an amount approximately equal and opposite to the deflection of the pitch pendulous means under the action of forward acceleration.

6. A combination as set forth in claim 5 wherein the means responsive to the rate of change of lift of the airplane includes a lift responsive means having an electrical output and a capacitor in said output, the output of the means responsive to the rate of change of lift of the airplane being the charge and discharge current of the capacitor.

7. A combination as set forth in claim 6 wherein the adding means is an amplifier.

8. A combination as set forth in claim 7 wherein the amplifier is a magnetic amplifier.

9. In a gyro erection system for an airplane mounted vertical gyro and which system includes a gyro pitch erecting means controlled by a pendulous means turning about a lateral axis and by a gyro pitch pickoff so that the pitch position of the gyro spin axis is slaved to the pitch position of the pendulous means, said gyro pitch erecting means being thereby subject to error caused by forward acceleration: means to angularly shift the pitch position of the gyro spin axis from the pitch position of the pendulous means by an amount equal to the error caused by forward acceleration, said angular shifting means comprising means responsive to the rate of change of lift of the airplane and means connecting said last named means to the gyro pitch erecting means to additionally control the gyro pitch erecting means in a direction opposite to that in which the gyro pitch erecting means is affected by forward acceleration of the airplane.

10. In a gyro erection system for an airplane mounted vertical gyro and which system includes a gyro pitch erecting means controlled by a pendulous means turning about a lateral axis and by a gyro pitch pickoff so that the pitch position of the gyro spin axis is slaved to the pitch position of the pendulous means, said gyro pitch erecting means being thereby subject to error caused by forward acceleration: means responsive to the rate of change of lift of the airplane to angularly shift the pitch position of the gyro spin axis from the pitch position of the pendulous means by an amount equal to the error caused by forward acceleration.

11. In a gyro erection system for an airplane mounted vertical gyro, a gyro pitch erecting means controlled by a pendulous means turning about a lateral axis and subject to error caused by forward acceleration of an airplane, and an error correcting arrangement comprising means responsive to the rate of change of lift of the airplane and means connecting said last named means to the gyro pitch erecting means to additionally control the gyro pitch erecting means in a direction opposite to that in which the gyro pitch erecting means is affected by forward acceleration of the airplane.

12. In a gyro erection system for an airplane mounted vertical gyro, a gyro pitch erecting means controlled by a pendulous means turning about a lateral axis and subject to error caused by forward acceleration of an airplane, and an error correcting arrangement comprising means responsive to the rate of change of lift of the airplane and means connecting said last named means to the gyro pitch erecting means to additionally control the gyro pitch erecting means in a direction and to an extent which for decreasing lift is opposite and approximately equal to that in which the gyro pitch erecting means is affected by positive forward acceleration of the airplane.

13. In a gyro erection system for an airplane mounted vertical gyro, a gyro pitch erecting means controlled by a pendulous means turning about a lateral axis and subject to error caused by forward acceleration of an airplane, and an error correcting arrangement comprising means responsive to the rate of change of lift of the airplane and means connecting said last named means to the gyro pitch erecting means to additionally control the gyro pitch erecting means in a direction and to an extent which for decreasing lift is opposite and approximately equal to that in which the gyro pitch erecting means is affected through the pendulous means by positive forward acceleration of the airplane.

14. In a gyro erection system for an airplane mounted vertical gyro, a gyro pitch erecting means controlled by a pendulous means turning about a lateral axis and by a gyro pitch pickoff so that the pitch position of the gyro spin axis is slaved to the pitch position of the pendulous means, said gyro pitch erecting means thereby being subject to error caused by forward acceleration and means to angularly shift the pitch position of the gyro spin axis from the pitch position of the pendulous means by an amount equal to the error caused by forward acceleration, said angular shifting means comprising means responsive to the rate of change of lift of the airplane and means connecting said last named means to the gyro pitch erecting means to additionally control the gyro pitch erecting means in a direction opposite to that in which the gyro pitch erecting means is affected by forward acceleration of the airplane.

15. In a gyro erection system for an airplane mounted vertical gyro, a gyro pitch erecting means controlled by a pendulous means turning about a lateral axis and by a gyro pitch pickoff so that the pitch position of the gyro spin axis is slaved to the pitch position of the pendulous means, said gyro pitch erecting means thereby being subject to error caused by forward acceleration, and means responsive to the rate of change of lift of the airplane to angularly shift the pitch position of the gyro spin axis from the pitch position of the pendulous means by an amount equal to the error caused by forward acceleration.

No references cited.

FERGUS S. MIDDLETON, *Primary Examiner.*